United States Patent
Koo et al.

(10) Patent No.: US 10,191,716 B2
(45) Date of Patent: Jan. 29, 2019

(54) METHOD AND APPARATUS FOR RECOGNIZING VOICE IN PORTABLE DEVICE

(71) Applicant: Samsung Electronics Co., Ltd., Suwon-si, Gyeonggi-do (KR)

(72) Inventors: Youngdae Koo, Seoul (KR); Taehyung Kim, Suwon-si (KR); Howon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 14/332,863

(22) Filed: Jul. 16, 2014

(65) Prior Publication Data
US 2015/0025883 A1    Jan. 22, 2015

(30) Foreign Application Priority Data

Jul. 16, 2013 (KR) .................. 10-2013-0083704

(51) Int. Cl.
*G06F 3/16* (2006.01)
*G10L 15/08* (2006.01)
*G10L 15/22* (2006.01)

(52) U.S. Cl.
CPC .............. *G06F 3/167* (2013.01); *G10L 15/22* (2013.01); *G10L 2015/088* (2013.01); *G10L 2015/223* (2013.01)

(58) Field of Classification Search
CPC .............................................. G10L 2015/223
See application file for complete search history.

(56) References Cited

U.S. PATENT DOCUMENTS

| | | | | |
|---|---|---|---|---|
| 5,600,765 A | * | 2/1997 | Ando ................... | G06F 3/038 345/668 |
| 6,133,904 A | * | 10/2000 | Tzirkel-Hancock .... | G10L 15/26 345/156 |
| 6,311,150 B1 | * | 10/2001 | Ramaswamy ....... | G06F 17/2765 704/1 |
| 6,438,523 B1 | * | 8/2002 | Oberteuffer ............ | G06F 3/038 382/186 |
| 6,556,970 B1 | * | 4/2003 | Sasaki ................ | G01C 21/3608 382/100 |

(Continued)

OTHER PUBLICATIONS

Sedivy, Jana, and Hilary Johnson. "Supporting creative work tasks: the potential of multimodal tools to support sketching." Proceedings of the 3rd conference on Creativity & cognition. ACM, 1999.*

(Continued)

*Primary Examiner* — Brian L Albertalli
(74) *Attorney, Agent, or Firm* — Jefferson IP Law, LLP (57) ABSTRACT

A method and an apparatus for recognizing voice in a portable terminal, and more particularly, a method and an apparatus for recognizing voice by re-combining commands in a portable terminal is provided. The method of controlling an application in a portable terminal includes displaying a voice control application, extracting keywords in a unit of a command from a received voice when receiving the voice, and classifying the keywords, rearranging the classified keywords according to a set control order, and generating a final command, and executing a function by processing the final command.

21 Claims, 9 Drawing Sheets

(56) References Cited

U.S. PATENT DOCUMENTS

| | | | | |
|---|---|---|---|---|
| 6,836,760 | B1* | 12/2004 | Bellegarda | G10L 15/1822 704/238 |
| 7,036,080 | B1* | 4/2006 | James | G10L 15/26 704/275 |
| 7,096,163 | B2* | 8/2006 | Reghetti | G10L 15/26 703/1 |
| 7,149,695 | B1* | 12/2006 | Bellegarda | G10L 15/1815 704/251 |
| 7,222,073 | B2* | 5/2007 | Julia | G10L 15/26 704/257 |
| 7,480,619 | B1* | 1/2009 | Scott | G10L 11/00 704/275 |
| 7,949,536 | B2* | 5/2011 | Mowatt | G10L 15/193 704/254 |
| 2005/0234726 | A1* | 10/2005 | Torge | G06N 5/04 704/270.1 |
| 2006/0074668 | A1* | 4/2006 | Helletzgruber | G06F 17/27 704/257 |
| 2007/0185702 | A1* | 8/2007 | Harney | G06F 17/271 704/4 |
| 2009/0112605 | A1* | 4/2009 | Gupta | B60R 16/0373 704/275 |
| 2010/0066684 | A1 | 3/2010 | Shahraray et al. | |
| 2012/0035925 | A1* | 2/2012 | Friend | G06F 3/167 704/235 |
| 2013/0246050 | A1* | 9/2013 | Yu | G10L 15/1822 704/9 |

OTHER PUBLICATIONS

Pausch, Randy, and James H. Leatherby. "An empirical study: Adding voice input to a graphical editor." Journal of the American Voice Input/Output Society. 1991.*

Imura, Atsushi, Tomohiro Takagi, and Toru Yamaguchi. "Intention recognition using conceptual fuzzy sets." Fuzzy Systems, 1993., Second IEEE International Conference on. IEEE, 1993.*

Alabiso, B., and A. Kronfeld. "16 LEAP: Language Enabled Applications." Machine Conversations (1999): 187.*

Bimber, Oliver, L. Miguel Encarnacao, and Andre Stork. "A multi-layered architecture for sketch-based interaction within virtual environments." Computers & Graphics 24.6 (2000): 851-867.*

* cited by examiner

METHOD AND APPARATUS FOR RECOGNIZING VOICE IN PORTABLE DEVICE

CROSS-REFERENCE TO RELATED APPLICATION(S)

This application claims the benefit under 35 U.S.C. § 119(a) of a Korean patent application filed on Jul. 16, 2013 in the Korean Intellectual Property Office and assigned Serial number 10-2013-0083704, the entire disclosure of which is hereby incorporated by reference.

TECHNICAL FIELD

The present disclosure relates to a method and an apparatus for recognizing voice in a portable terminal. More particularly, the present disclosure relates to a method and an apparatus for recognizing voice by re-combining commands in a portable terminal.

BACKGROUND

Together with development of digital technology, various functions of a portable terminal have been recently developed. The portable terminal may include a call function, such as a voice call and a video call, a message transceiving function, such as Short Message Service (SMS)/Multimedia Message Service (MMS), and an email function, a navigation function, a photographing function, a broadcasting playing function, a media (video and music) playing function, an Internet function, a messenger function, a Social Network Service (SNS) function, and the like.

Particularly, the current portable terminal may adopt a method using a voice input, as well as a method using a key input or a touch input, in performing the above enumerated various functions. An input method through the voice recognition of the portable terminal will be described. A basic command may be comparatively simply processed because a command having a meaning corresponding to a voice is searched by using an internal database. However, when the portable terminal processes a complicated command in the form of speech, the portable terminal processes a request of the user through communication with a voice recognition server. Accordingly, in order for the portable terminal to process the input voice by using the internal database, the command needs to have about one word, which is very simple. Otherwise, when the portable terminal processes a more complicated command, the portable terminal processes the input voice through an external server, so that a processing rate is decreased. Accordingly, the current voice recognition method in the portable terminal demands a new method for solving the problem of limitations in commands searchable within the terminal and a delay in the processing rate.

Accordingly, a method and an apparatus for recognizing a complex voice command of a user by using embedded voice recognition data is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for recognizing a complex voice command of a user by using embedded voice recognition data.

In accordance with an aspect of the present disclosure, an apparatus for controlling an application in a portable terminal is provided. The apparatus includes a display unit configured to display execution of a voice control application, an audio processing unit configured to receive a voice of a user, a controller configured to extract and classify keywords in a unit of a command from a received voice when receiving the voice, to rearrange the keyword, and to generate a final command, and a storage unit configured to store a database necessary for rearranging the keywords.

In accordance with an aspect of the present disclosure, a method of controlling an application in a portable terminal is provided. The method includes displaying a voice control application, extracting keywords in a unit of a command from a received voice when receiving the voice, and classifying the keywords, rearranging the classified keywords according to a set control order, and generating a final command, and executing a function by processing the final command.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Certain embodiments of the present disclosure illustrated and described in this specification and the drawings correspond to specific examples presented in order to easily explain technical contents of the present disclosure, and to help comprehension of the present disclosure, but are not intended to limit the scope of the present disclosure. It is obvious to those skilled in the art to which the present disclosure pertains that other modified embodiments on the basis of the spirit of the present disclosure besides the embodiments disclosed herein can be carried out.

Hereinafter, a complex command refers to a command formed of two or more keywords. That is, the complex command may have a form of a sentence including a subject and a verb, and includes two or more words simply enumerated. For example, the complex command in the form of a sentence may be "send a message", and the complex in the form of enumerated words may be a "red pencil".

Further, hereinafter, a keyword means one unit based on which a command extracted from character data of an input voice may be performed. In this case, the keyword is extracted from character data of an input voice by command keyword data, and one keyword belongs to a specific category.

Further, a final command is a command generated through a process of rearranging the keywords according to their priority. That is, the final command may include a plurality of keywords. That is, the voice complex command may be configured of a plurality of keywords.

Further, a voice control application means an application including a voice recognition related database so that a function within the application may be performed by voice recognition in a state where the application is executed. Here, the application may include a note application capable of enabling a user to write a memo, make a drawing, and/or write a document, and data corresponding to a function (for example, a pen setting change) of the corresponding application may be provided for a voice recognition service.

Figure 1:
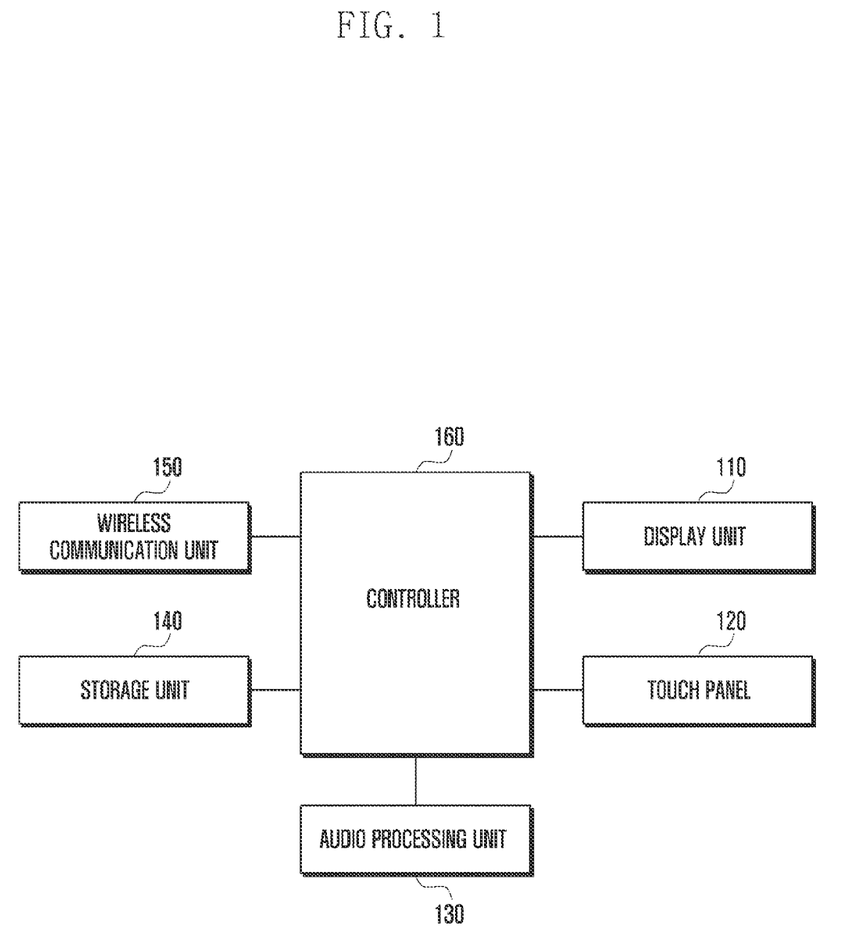
FIG. 1 is a diagram schematically illustrating a configuration of a portable terminal according to an embodiment of the present disclosure.

FIG. 1 is a diagram schematically illustrating a configuration of a portable terminal according to an embodiment of the present disclosure.

Referring to FIG. 1, the portable terminal of the present disclosure may include a display unit 110, a touch panel 120, an audio processing unit 130, a storage unit 140, a wireless communication unit 150, and a controller 160, but is not limited thereto. The display unit 110 and the touch panel 120 may be integrally formed.

The display unit 110 may be formed of a Liquid Crystal Display (LCD), an Organic Light Emitting Diode (OLED), an Active Matrix Light Emitting Diode (AMOLED), and the like, and visually provides a user with a menu of the portable terminal, input data, and various elements of information, such as function setting information. The display unit 110 according to the embodiment of the present disclosure may display a screen image of a specific application (for example, a note application) supporting a voice recognition function. Further, the display unit 110 may display a result of performance of the voice recognition (for example, execution of an interlocking application) to the user.

The touch panel 120 is a device for detecting a touch input of the user. The touch panel 120 may be driven by a scheme of a capacitive overlay scheme, a resistive overlay scheme, an infrared beam detecting scheme, and the like. In addition to the methods, all types of schemes capable of detecting a contact or pressure of an object may be applied to the touch panel 120. The touch panel 120 detects whether a touch is input, and a position of a point at which a touch is generated. Further, the touch panel 120 in the present disclosure may additionally include an electromagnetic induction type touch panel for detecting only a touch input of a touch pen. The touch panel 120 according to the embodiment of the present disclosure may detect a touch input of the user during a process of executing a specific application performing the voice recognition. Otherwise, the touch panel 120 may detect a touch operation of the user performed in order to confirm a result of the performance of the voice recognition (for example, a pen setting change), and transmit the detected touch operation to the controller 160.

The audio processing unit 130 may be combined with a speaker SPK (not illustrated) and a microphone MIC (not illustrated) to input and output an audio signal for recording a voice and making a call. The audio processing unit 130 may convert audio data into audible sound and output the converted audible sound under a control of the controller 160, and convert audio data received from the microphone to a digital signal and transmit the converted digital signal to the controller 160. Further, the audio processing unit 130 may include a voice recognizing unit. Here, the voice recognizing unit may perform a function of converting a voice language to character data (speech to text).

The storage unit 140 serves to store a program and data necessary for an operation of the portable terminal. The storage unit 140 according to the embodiment of the present disclosure may store a voice standard pattern so as to analyze a signal of a collected voice. Further, the storage unit 140 may store information (for example, a command keyword table) for analyzing a category of a keyword extracted from an input command. Further, the storage unit 140 may store priority information of a category necessary for rearranging the keywords. Further, the storage unit 140 may store information about a function performed by each command.

The wireless communication unit 150 performs a wireless communication function of a portable terminal. The wireless communication unit 150 includes a Radio Frequency (RF) transmitter for up-converting and amplifying a frequency of a transmitted signal and an RF receiver for low-noise amplifying a received signal and down-converting a frequency. Further, the wireless communication unit 150 may include a mobile communication module, such as Long Term Evolution (LTE), Code Division Multiple Access (CDMA), a digital broadcasting module, such as Digital Multimedia Broadcasting (DMB), Digital Video Broadcasting (DVB), a wireless Internet communication module, such as WiFi and Wibro, and a near field communication module, such as Near Field Communication (NFC) and Bluetooth. When the user gives a command of performing a specific function (a message sending function or an email sending function) requiring a wireless communication function with a voice, the wireless communication unit 150 according to the embodiment of the present disclosure may support a wireless communication process necessary for performing the function.

The controller 160 may control various operations related to a typical function of the portable terminal. The controller 160 may include the voice recognizing unit and a character converting unit. That is, the voice recognizing unit and the character converting unit may be configured in the audio processing unit 130, or may be configured inside the controller 160. In the various embodiments of the present disclosure, the present disclosure will be described with the assumption that the voice recognizing unit and the character converting unit are configured inside the controller 160.

The controller 160 analyzes whether an application is a voice control application when executing the application. Here, the voice control application means an application capable of setting a function or controlling an operation of an application through a voice command. In the various embodiments of the present disclosure, the present disclosure will be described on an assumption that the voice control application is the note application.

The controller 160 displays an execution screen image of the note application on the display unit 110 when executing the note application. Further, the controller 160 recognizes a voice input through the audio processing unit 130 through the voice recognizing unit (not illustrated), and converts recognized voice data to character data. Then, the controller 160 analyzes the converted character data, and extracts the analyzed character data as keywords of the voice command. Further, the controller 160 may classify the extracted keywords for each category of the function and/or the operation based on the command keyword table stored in the storage unit 140, and determine a priority of the classified category. Further, the controller 160 may rearrange the keywords classified for each category according to the priority of the category. Further, the controller 160 may generate a final command through a process of rearranging the keywords. Further, the controller 160 may perform a process of processing the final command, and in this case, the controller 160 may process the final command based on a command function definition table stored in the storage unit 140.

Figure 2:
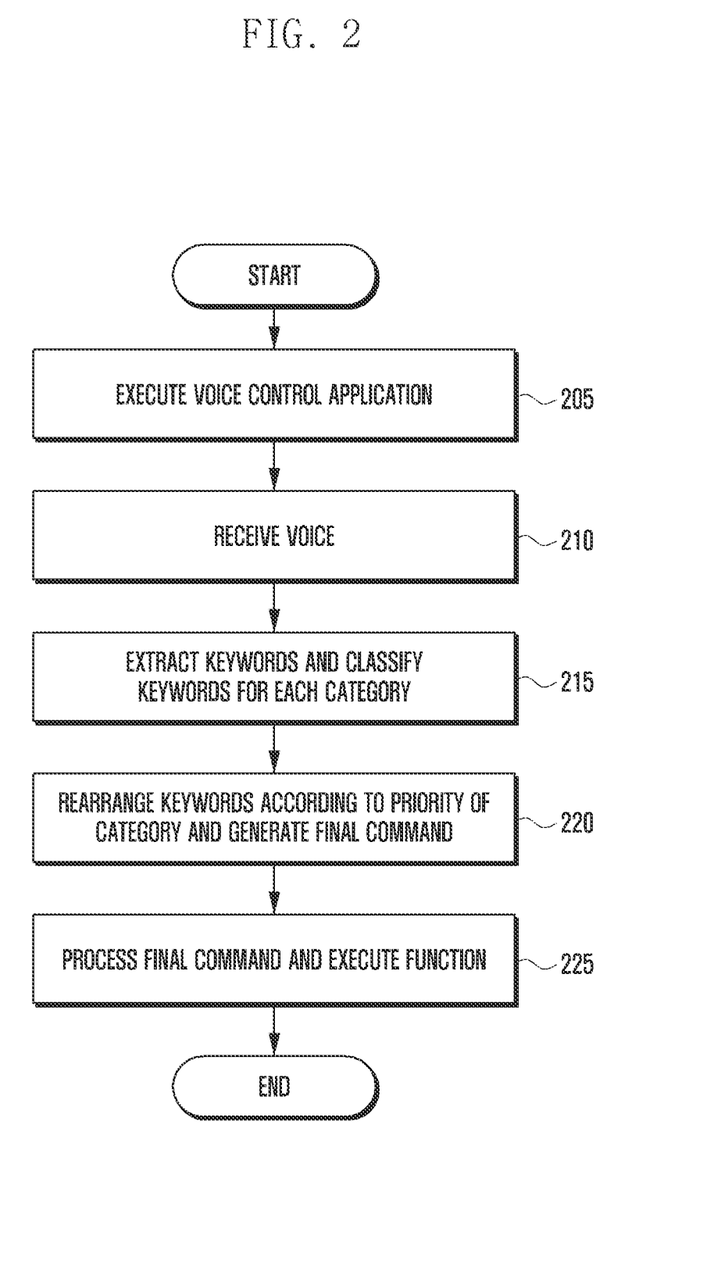
FIG. 2 is a flowchart illustrating a voice recognition process according to an embodiment of the present disclosure.

FIG. 2 is a flowchart illustrating a voice recognition process according to an embodiment of the present disclosure.

Referring to FIG. 2, the controller 160 may execute a voice control application capable of performing a function by using voice recognition in operation 205. The voice control application refers to an application capable of executing a function and controlling an operation of an application through a voice command. For example, the voice control application may turn on/off of the corresponding application by a voice command of a user, and further, execute a function desired by the user and/or control an operation in a state where the application is executed. In the embodiment of the present disclosure, the voice control application may be a note application having a pen setting change function and an interlocking application execution function. Further, the voice control application may be an email or SNS application for transmitting written information. In this case, in the note application, information (for example, the type and a color of the pen) related to the pen setting change may be provided as data for a voice recognition service. Further, the voice control applications may enter a mode of automatically recognizing a voice after the execution of the voice control applications. Otherwise, when the user inputs a specific key and/or a touch in a state where the application is executed under the control of the controller 160, the voice control application may enter a mode of recognizing the voice.

When a voice of the user is received in a state where the application is executed, the controller 160 may detect the received voice in operation 210. That is, when the user inputs the voice in a state where the application is executed, the controller 160 processes the voice of the user. Further, the controller 160 recognizes a voice output from the audio processor 130 through the voice recognizing unit (not illustrated), and converts the recognized voice to character data. That is, when the controller 160 recognizes the voice of the user a state where the voice control application is executed, the controller 160 recognizes the received voice, and converts the recognized voice into a word, a set of words, or a sentence.

Further, after performing the voice recognition operation, the controller 160 may analyze the input voice data and extract keywords, and classify the extracted keywords according to a category in operation 215. The type of pen, a pen color, a pen thickness, a pen level, an interlocking application, and an operation may correspond to the category. For example, when a complex command "red ballpoint pen" is input, the controller 160 may extract two keywords "red" and "ballpoint pen". Further, "red" may correspond to the category of the "pen color" among the multiple categories, and "ballpoint pen" may correspond to the category of the "type of pen". The extracted keywords may be classified for each category based on a pre-stored database.

TABLE 1

| Priority | Category | Keyword list |
| --- | --- | --- |
| 1 | Type of pen | Marker pen, brush, pencil, highlighter, and the like. |
| 2 | Pen color | Red, blue, yellow, and the like. |
| 3 | Level | Highest, best, and the like. |
| 4 | Pen thickness | Heavier, thicker, thiner, slimmer, heavy, thick, thin, slim, and the like. |
| 5 | Interlocking application | Message, email, and the like. |
| 6 | Operation | Transmit, send, and the like. |

The database serving as a reference for extracting the keywords from the voice data and classifying the keywords may be stored in the storage unit 140 in a form of the keyword table. The table suggested above is an example of the keyword table. The types of categories and command keywords corresponding to the categories may be classified in the keyword table as illustrated. When the keywords are extracted, the controller 160 may extract the usable keywords based on the keyword table. Further, the keyword table may include information about a priority of the category demanded when a final command is generated. However, the keywords and the categories included in the keyword table may be more various than those suggested in the keyword table, and the priorities of the respective categories may be different from those suggested in the keyword table.

When the keywords are classified according to the categories, the controller 160 may rearrange the keywords in an order of their respective priority categories according to the keyword table in operation 220, and generate the final command.

Further, the controller 160 may process the final command according to the priority of the category, and execute a function corresponding to each keyword in operation 225. An example of a function definition table storing information about the function performed by each keyword is present below.

TABLE 2

| Keyword | Corresponding function |
|---|---|
| Marker pen | Change in type of pen (marker pen) |
| Pencil | Change in type of pen (pencil) |
| Thick | Change in pen thickness (+5) |
| Thin | Change in pen thickness (−5) |
| Message | Select interlocking application (message) |
| Email | Select interlocking application (email) |
| Highest | Set highest value for degree of modifying expression (change the pen thickness to the highest value, which is thickest) |

The function definition table enables the user to recognize a function of each keyword that is a command. This will be described in more detail. A keyword "marker pen" is a command of changing the type of pen to a marker pen, and a keyword "thicker" is a command to change a thickness value of the pen by +5. The suggested table represents a part of entire contents, and in addition, more commands and functions corresponding to the commands may be stored in the function definition table. Further, the keywords performing the same specific function may be variously present, and for example, commands performing the same function as that of "thicker" may include "thick", "heavy", and heavier".

Hereinafter, an example of performing the pen setting change function by using the voice recognition, such as the note application, will be described with reference to FIGS. 3 to 5.

Figure 3:
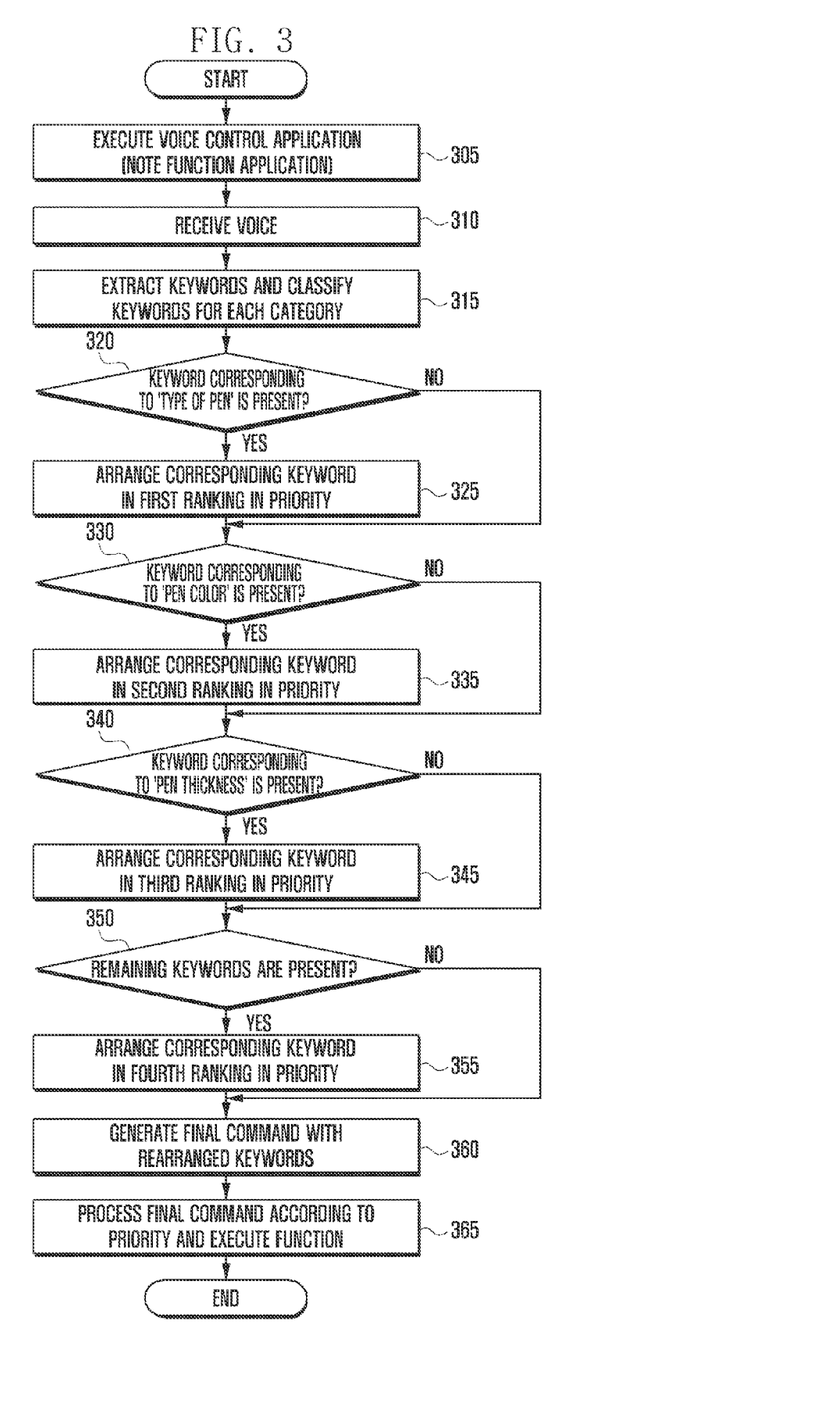
FIG. 3 is a flowchart illustrating a process of performing a pen setting change function by using voice recognition according to an embodiment of the present disclosure.

FIG. 3 is a flowchart illustrating a process of performing a pen setting change function using voice recognition according to an embodiment of the present disclosure.

Figure 4A:
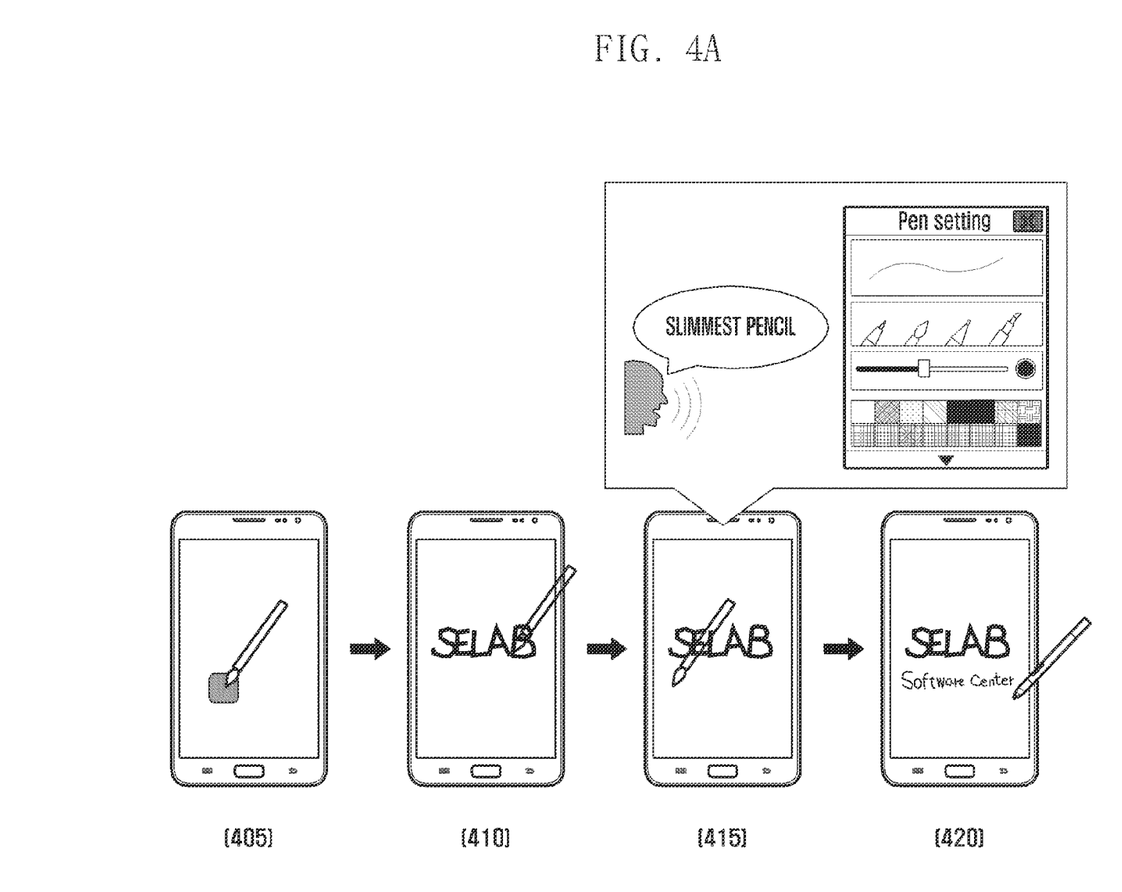
FIGS. 4A and 4B are diagrams illustrating states where a pen setting change function is performed using a voice recognition according to an embodiment of the present disclosure.
Figure 4B:
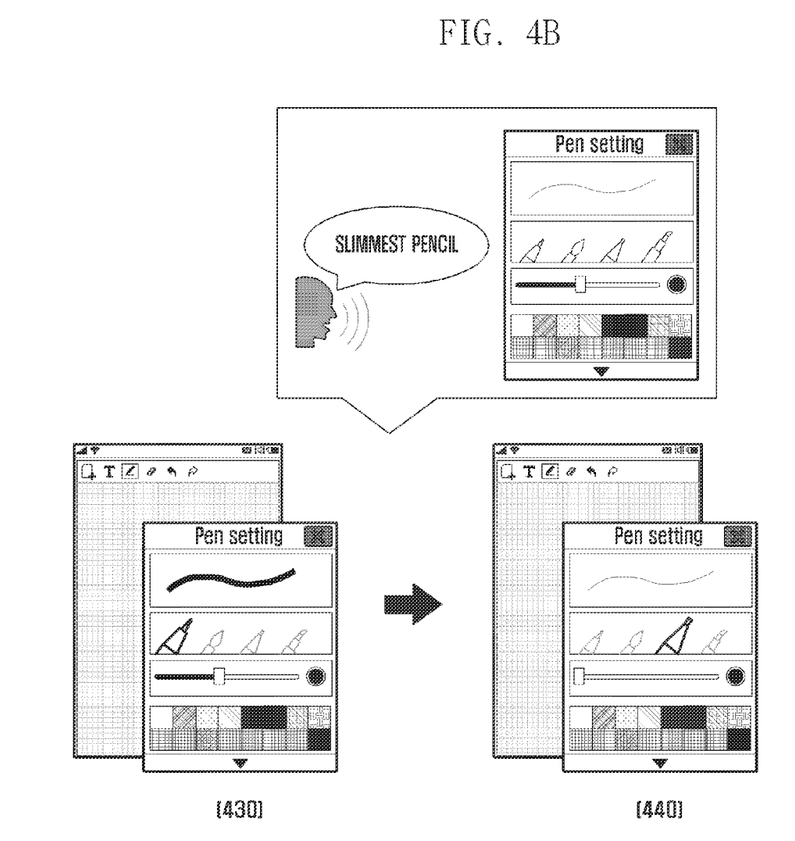

FIGS. 4A and 4B are diagrams illustrating states where a pen setting change function is performed using the voice recognition according to an embodiment of the present disclosure.

Figure 5:
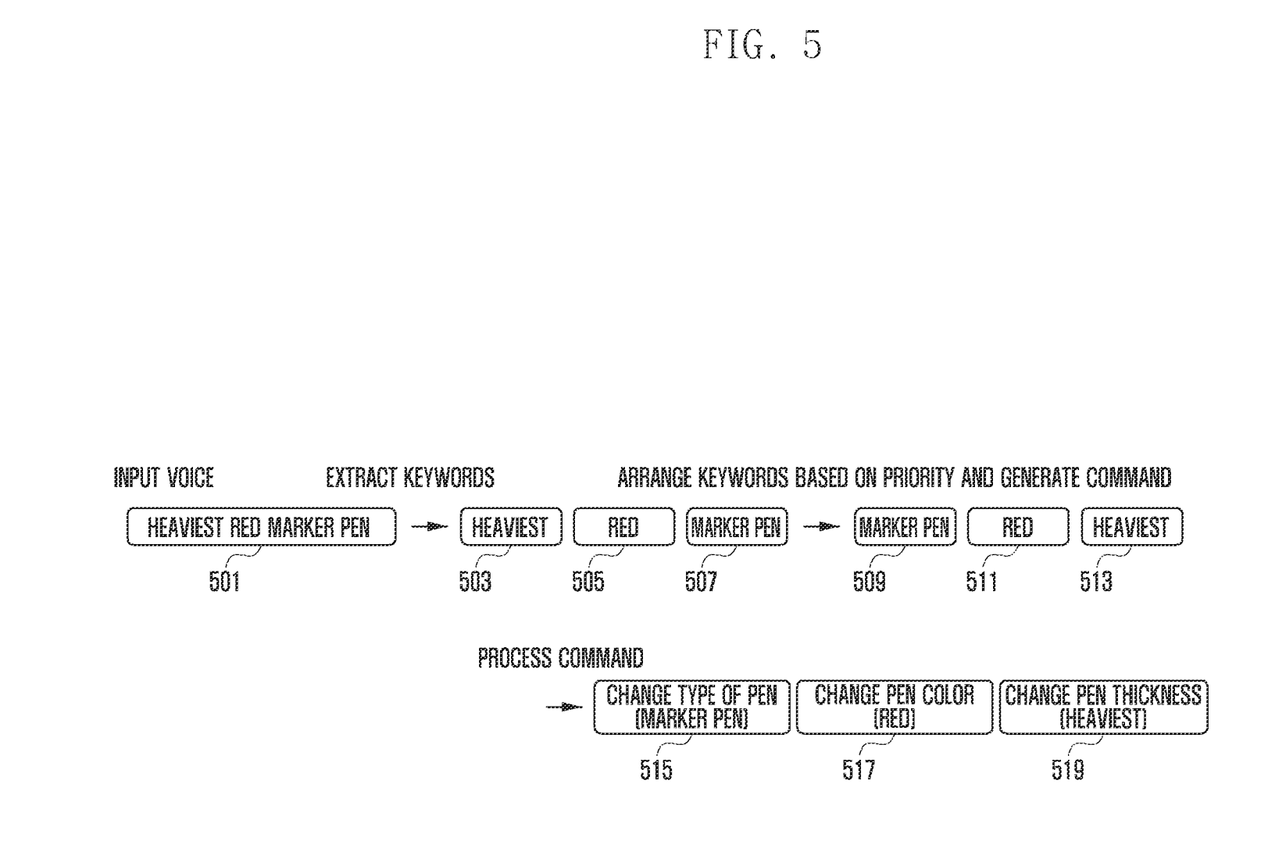
FIG. 5 is a diagram illustrating a process of processing a command by rearranging keywords related to a pen setting change according to an embodiment of the present disclosure.

FIG. 5 is a diagram illustrating a process of processing a command by rearranging keywords related to a pen setting change according to an embodiment of the present disclosure.

Referring to FIG. 3, the controller 160 may perform a process of executing a voice control application capable of controlling a pen setting function with voice recognition in operation 305. The note application may correspond to the voice control application. Further, the controller 160 may perform a process of confirming whether a voice is received in operation 310. Then, the controller 160 may extract keywords in operation 315, and classify the extracted keywords for each category. The keywords may be classified based on the keyword table.

Then, the controller 160 may perform a process of rearranging the keywords according to a priority of the category, which will be described in more detail. First, the controller 160 may perform a process of confirming whether a keyword corresponding to the "type of pen" among the categories is present in operation 320. When the corresponding keyword (for example, a marker pen) is present, the controller 160 may arrange the corresponding keyword with the first priority in operation 325. At operation 320, when the corresponding keyword is not present, the controller 160 may perform operation 330.

After operation 325, the controller 160 may confirm whether a keyword belonging to the category "pen color" among the multiple categories is present in operation 330. Then, when the keyword (for example, red) corresponding to "pen color" is present, the controller 160 may arrange the keyword with the second priority in operation 335. However, at operation 330 when the keyword is not present, the controller 160 may perform operation 340.

After operation 335, the controller 160 may confirm whether a keyword corresponding to "pen thickness" is present in operation 340. When the corresponding keyword is present, the controller 160 may arrange the keyword with the third priority in operation 345, and when the keyword corresponding to "pen thickness" is not present, the controller 160 may perform operation 350.

After operation 345, the controller 160 may confirm whether remaining keywords are present among the keywords extracted from the voice data in operation 350. In this case, at operation 350, when the remaining keywords are not present, the controller 160 may perform operation 360. When the remaining keywords are present, the controller 160 may arrange the keyword with the fourth or lower priority in operation 355. Then, the controller 160 may generate a final command based on the keywords rearranged according to the priorities in operation 360. Then, the controller 160 may process the command according to the priority, and execute the corresponding function in operation 365.

Referring to FIG. 4A, the flowchart will be described in more detail with reference to the drawings. Screen 405 indicates a state where the note function application is executed. Then, screen 410 indicates a state where the note function is performed with the previously set pen setting. In this case, it may be seen that the type of pen is set to be a brush. Then, screen 415 indicates a state where a user inputs a voice "slimmest pencil". In this case, the controller 160 may perform a function of changing the type of pen and a thickness of the pen through the voice recognition process. Further, screen 420 indicates a state where the setting of the pen is changed to a pencil having the smallest thickness. As described above, when the note application uses the voice recognition, the pen setting function may be operated as described above.

Referring to FIG. 4B, the process of changing the pen setting in the above process will be described in more detail. 4B. A state where the pen setting is changed from a ball pen having a middle thickness to a pencil having the smallest thickness is illustrated. Screen 430 indicates a state where the pen has an approximate middle value, and is set to be a ball pen. In this case, it may be seen that when the user inputs a voice "slimmest pencil," the type of pen is changed to the pencil, and the thickness of the pen is changed to a minimum value as indicated by screen 440. As described above, since the note application stores the keyword table in connection with the pen setting, the controller 160 may recognize the voice of the user and immediately perform the function.

Further, in order to describe the process of FIG. 3 based on a specific complex command as an example, a process of recognizing a voice in a case where voice data "heaviest red marker pen" is input will be described with reference to FIG. 5.

Referring to FIG. 5, a complex command "heaviest red marker pen" 501 is first input to the portable terminal from a user. Then, the controller 160 may extract keywords "heaviest" 503, "red" 505, and "marker pen" 507 from the input voice data. Further, each of the extracted keywords may be classified for each category to which the keyword belongs. To investigate the keyword with reference to the keyword table described as the example, the keyword "heaviest" 503 belongs to the category "pen thickness" and the third ranking in the priority, the keyword "red" 505 belongs to the category "pen color" corresponding to the second ranking in the priority, and the keyword "marker pen" 507 belongs to the category "type of pen" corresponding to the first ranking in the priority. As described above, the controller 160 may classify the respective keywords for each category, and arrange the keywords based on the priority of the category as illustrated in FIG. 5. More particularly, the respective keywords of the command "heaviest red marker pen" 501 may be arranged in an order of "marker pen" 509, "red" 511, and "heaviest" 513. Further, the controller 160 may generate a final command based on the keywords rearranged according to the priority. Further, the controller 160 may perform the step of processing the final command. More particularly, the controller 160 may process a command "marker pen" 509 as a function of changing the type of pen 515 into the marker pen. Further, the controller 160 may process a command "red" 511 as a function of changing the color of the pen into red 517. Further, the controller 160 may process a command "heaviest" 513 as a function of changing a thickness of the pen 519 to have the largest value.

Further, a process of performing the voice recognition by a specific voice control application (for example, a note application or a memo application) capable of executing an interlocking application by using the voice recognition will be described with reference to FIGS. 6 to 8.

Figure 6:
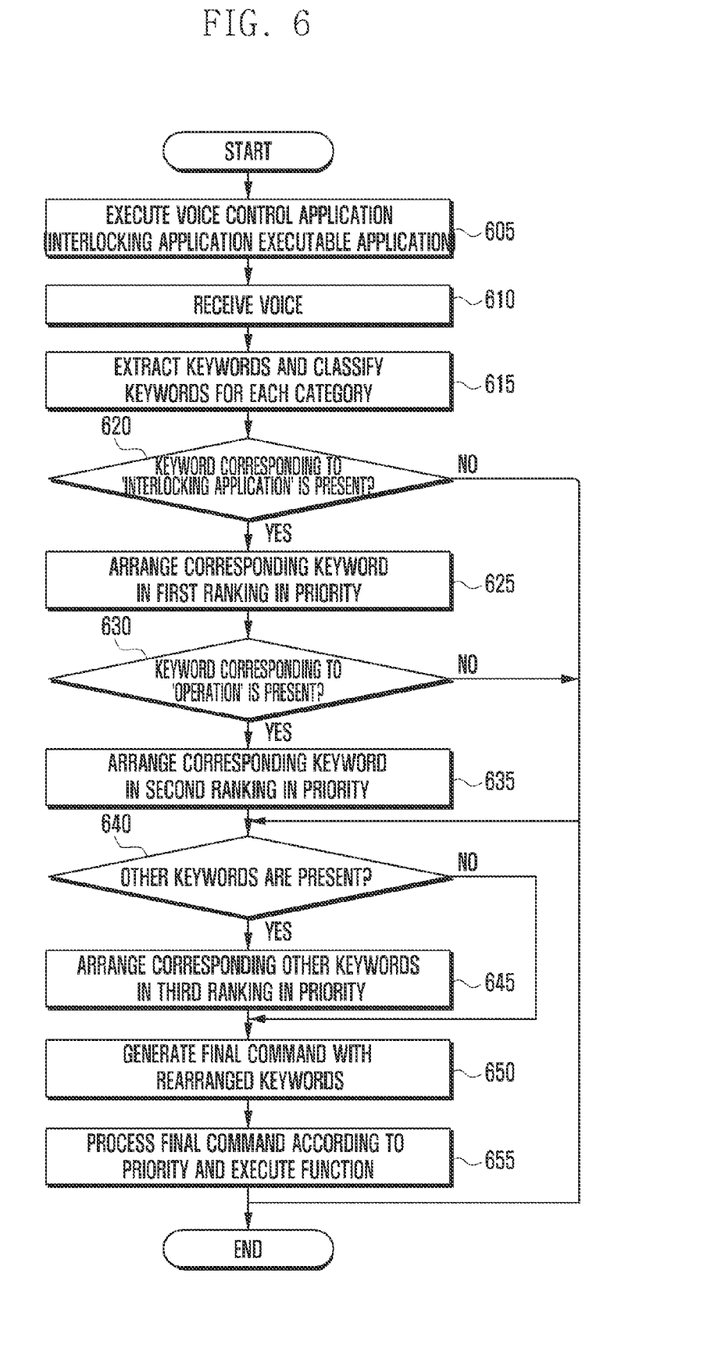
FIG. 6 is a flowchart illustrating a process of performing an interlocking application execution function by using a voice recognition according to an embodiment of the present disclosure.

FIG. 6 is a flowchart illustrating a process of performing an interlocking application execution function by using the voice recognition according to an embodiment of the present disclosure.

Figure 7:
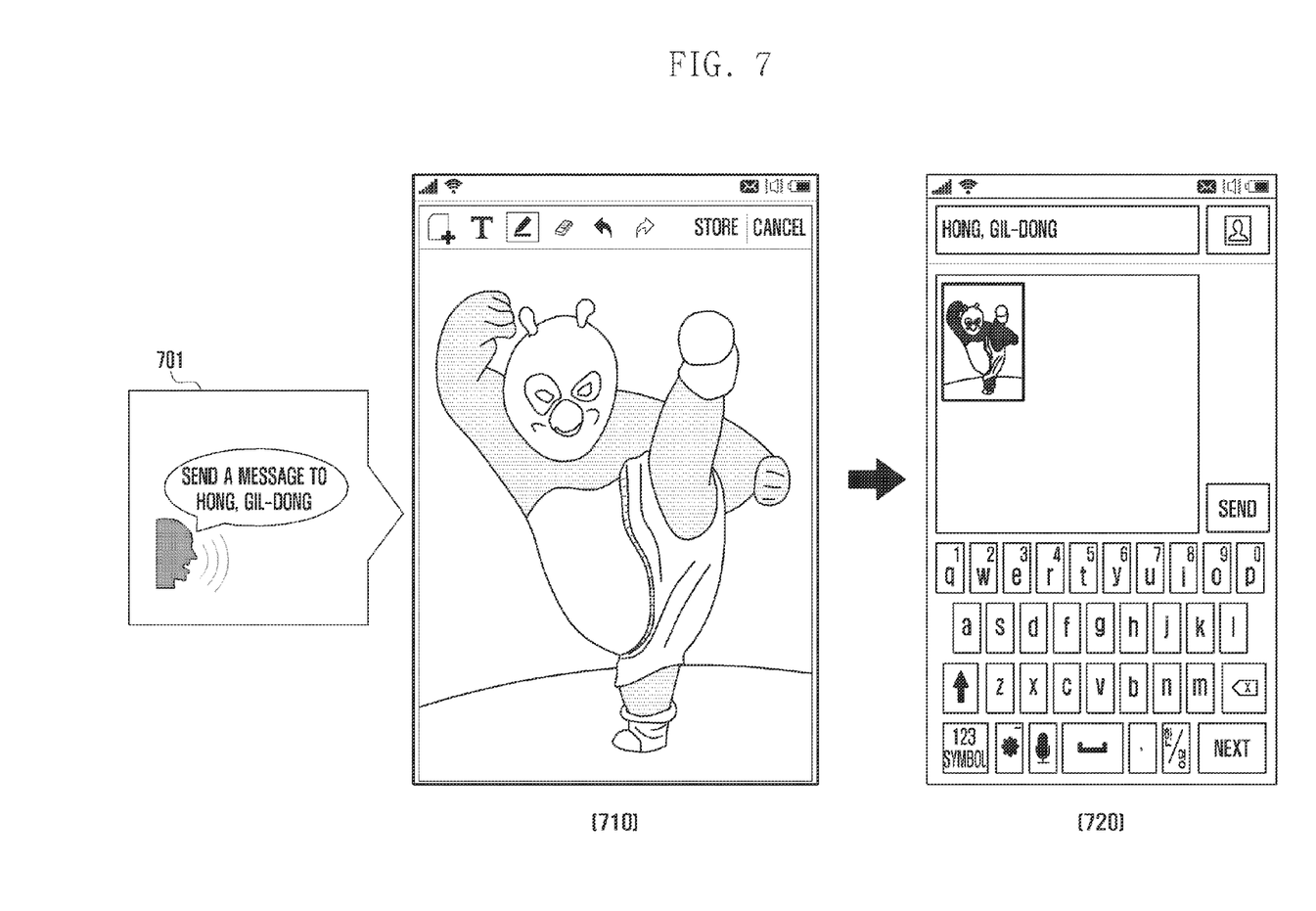
FIG. 7 is a diagram illustrating a state where an interlocking application is executed using voice recognition according to an embodiment of the present disclosure.

FIG. 7 is a diagram illustrating a state where an interlocking application is executed using voice recognition according to an embodiment of the present disclosure.

Figure 8:
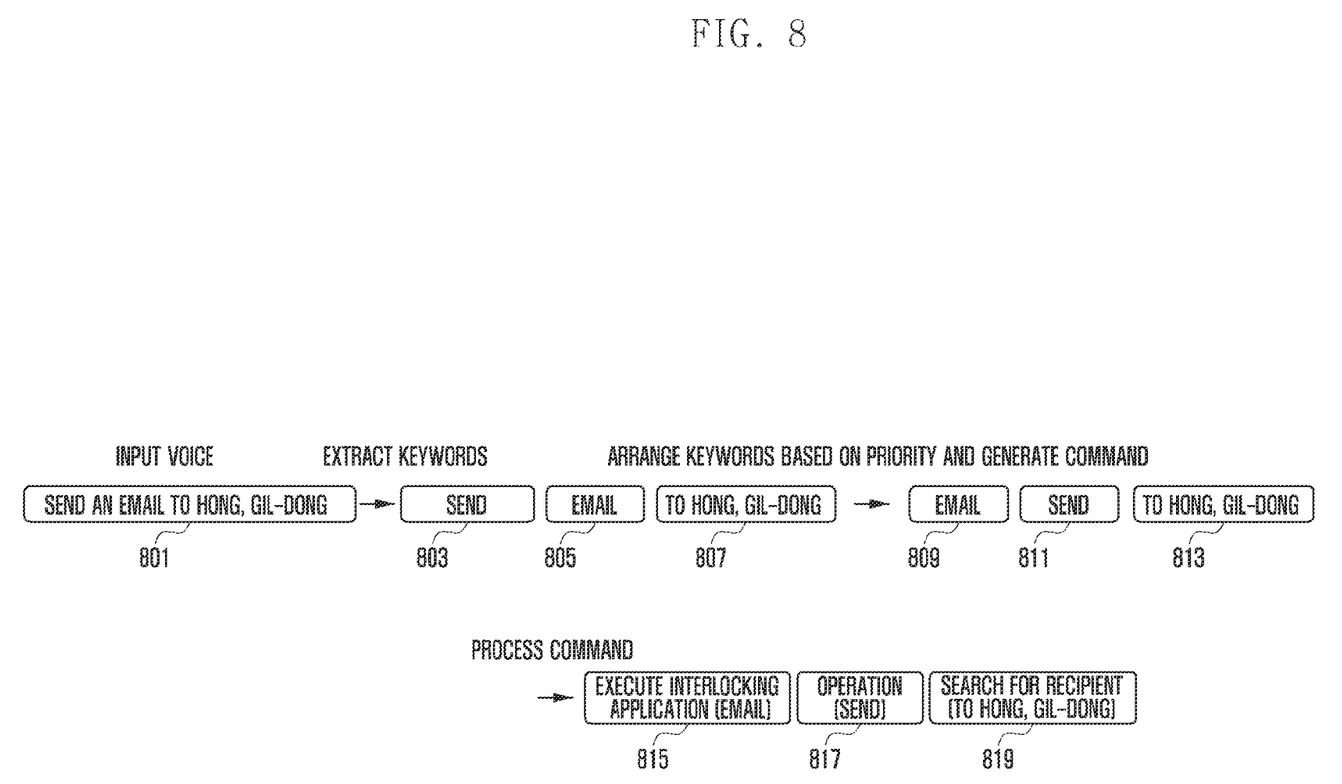
FIG. 8 is a diagram illustrating a process of processing a command by rearranging keywords related to the interlocking application execution according to an embodiment of the present disclosure.

FIG. 8 is a diagram illustrating a process of processing a command by rearranging keywords related to the interlocking application execution according to an embodiment of the present disclosure.

Referring to FIG. 6, the controller 160 may execute a voice control application capable of performing an interlocking application execution function through the voice recognition in operation 605. For example, the application may correspond to the memo application or a note application. When the application is executed, the controller 160 may automatically perform a voice recognition mode, in which a microphone function is activated so as to collect a voice for the voice recognition, or enter the voice recognition mode through a touch event of the user and the like.

Further, the controller 160 may perform a process of receiving a voice of the user in operation 610. When the voice is received, the controller 160 may perform a process of extracting keywords from voice data and classifying the keywords based on a category in operation 615. In this case, a concept related to the execution of the interlocking application, such as the "interlocking application" and the "operation", may correspond to the category.

When the keywords are classified for each category, the controller 160 may confirm whether a keyword corresponding to the "interlocking application" is present in operation 620. In this case, when the controller 160 determines that the keyword classified to the category "interlocking application" is present in the extracted keywords, the controller 160 may arrange the keyword in the first ranking in the priority in operation 625. The keyword corresponding to the "interlocking application" may include an email, a message, and the like. Thereafter, the controller 160 may confirm whether a keyword corresponding to a category "operation" is present in operation 630. For example, execution, transmission, and the like may correspond to the keyword corresponding to the category "operation". When the keyword corresponding to the "operation" category is present, the controller 160 may arrange the corresponding keyword in the second ranking in operation 635. Further, the keywords belonging to the categories "interlocking application" and the "operation" may not perform specific functions, so that when the keyword belonging to the "interlocking application" in operation 620, or the keyword corresponding to the "operation" is not present, the controller 160 may terminate the sequence of FIG. 6 in operation 630.

After operation 635, the controller 160 may confirm whether a keyword belonging to other categories is present among the keywords extracted from the voice data in operation 640. When another keyword is present, the controller 160 may arrange another keyword in the third ranking in the priority in operation 645. However, when another keyword is not present, the controller 160 may perform operation 650.

After performing operation 645, the controller 160 may generate a final command with the rearranged keywords in operation 650. Then, the controller 160 may process the command according to the priority and execute the function in operation 655.

The process of executing the command through the voice recognition in the voice control application has been described, and the process will be described with reference to FIG. 7.

Referring to FIG. 7, screen 710 illustrates a state where the note function application is currently executed, and a picture is drawn on a screen. Further, screen 710 indicates a state where a user inputs a complex command "send a message to HONG, Gil-Dong" 701 with a voice in a situation where the picture is drawn on the screen. The user may execute an interlocking application by inputting the command with a voice in a specific application (note function application), through which an operation is controllable through the voice recognition. When the controller 160 receives the voice command of the user, the controller 160 may display a message writing screen image in screen 720 through a process of processing the command. The screen image indicated by screen 720 will be described in more detail. "HONG, Gil-Dong" is selected in a box of the message writing screen image for writing the telephone number of the recipient. Otherwise, the controller 160 may fetch a telephone number stored with "HONG, Gil-Dong" in an address book pre-stored in the storage unit 140 and place it in the box for writing a telephone number of a recipient. Further, the drawing written in the note function application is attached to a message writing window within the message writing screen image indicated in screen 720.

Referring to FIG. 8, a process of rearranging the keywords and generating a final command when the user inputs the complex command "send an email to HONG, Gil-Dong" with a voice is illustrated. The controller 160 may extract "send" 803, "email" 805, and "to HONG, Gil-Dong" 807 as the keywords from voice data input as "send an email to HONG, Gil-Dong" 801. Then, the controller 160 may classify the extracted keywords according to the category. Referring to operations 620 and 625 of FIG. 6, the keyword "email" 805 belonging to the category "interlocking application" may be arranged in the first ranking. Further, the keyword "send" belongs to the category "operation", and referring to operations 630 and 635 of FIG. 6, the keyword "send" 803 belonging to the category "operation" may be arranged in the second ranking in the priority. Although not illustrated in the keyword table, the keyword "HONG, Gil-Dong" 807 may also be classified into a specific category. In the above process, the categories, to which "to HONG, Gil-Dong" 807 belong, may be set to a lower ranking than that of the categories "interlocking application and "operation". In this case, an order of the keywords arranged based on the priority of the category is "email" 809, "send" 811, and "to HONG, Gil-Dong" 813. Then, the controller 160 may generate a final command based on the rearranged keywords. The controller 160 may process the final command based on a database, such as the aforementioned command function definition table. More particularly, a function corresponding to "email" 809 in the final command is "execute an interlocking application" 815, so that the controller 160 selects an email application as the interlocking application, and a function corresponding to "send" 811 is the "operation" 817, so that the controller 160 executes an email sending window. Further, a function corresponding to "to HONG, Gil-Dong" 813 may be "search for a recipient" 819, and the controller 160 may search for "HONG, Gil-Dong" in the address book and select the found "HONG, Gil-Dong" as a recipient.

In the above example, only a case where the command for the pen function setting and the command for the interlocking application execution are separately given has been described. However, in a voice control application capable of executing both the pen function setting and the interlocking application execution by using the voice recognition, similar to the note application, the categories, such as the "interlocking application" and the "operation", related to the interlocking application execution may be set to a lower priority than that of the category related to the pen function setting.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling an application in an electronic device, the method comprising:
    executing a voice control application;
    receiving a voice from a user of the electronic device;
    extracting a plurality of keywords from the received voice;
    classifying the extracted respective keywords based on word categories;
    rearranging the respective keywords in an order pre-set for each category;
    generating a final command based on an order of the rearranged keywords; and
    executing, by processing the final command, a function of the voice control application.

2. The method of claim 1, wherein the voice control application includes a note application executed by a pen input.

3. The method of claim 1, further comprising:
    converting the received voice into character data.

4. The method of claim 1, wherein the categories comprise a pen color, a type of pen, a pen thickness, and an execution level of the function.

5. The method of claim 4, wherein the executing of the function comprises one of setting and changing the pen color, the type of pen, the pen thickness, and the execution level of the function in the order of the categories according to the final command.

6. The method of claim 4, wherein the categories further comprise an "interlocking application" and an "operation".

7. The method of claim 6, wherein the interlocking application comprises one of an email application and a social network service (SNS) application.

8. The method of claim 7, wherein the executing of the function comprises processing information received in the note voice control application through an interlocking application according to rearranged commands.

9. The method of claim 1, wherein the classifying of the extracted respective keywords based on the word categories comprises classifying respective keywords based on a category table pre-stored in a storage unit.

10. The method of claim 1, wherein the executing of the function comprises identifying function commands corresponding to the respective keywords and executing the identified function commands in the order of the categories.

11. At least one non-transitory processor readable medium for storing a computer program of instructions configured to be readable by at least one processor for instructing the at least one processor to execute a computer process for performing the method as recited in claim 1.

12. An apparatus for controlling an application in an electronic device, the apparatus comprising:
    a display unit configured to display execution of a voice control application;
    an audio processing unit configured to receive a voice from a user of the electronic device;
    a controller configured to:
        extract a plurality of keywords from the received voice, classify the extracted respective keywords based on word categories, rearrange positions of the respective keywords in an order pre-set for each category, generate a final command based on an order of the rearranged keywords, and execute, by processing the final command, a function of the voice control application; and a storage unit configured to store priorities of the categories.

13. The apparatus of claim 12, wherein the voice control application comprises a note application.

14. The apparatus of claim 12, wherein the controller is further configured to convert the received voice to character data.

15. The apparatus of claim 12, wherein the categories comprise a pen color, a type of pen, a pen thickness, and an execution level of a function.

16. The apparatus of claim 15, wherein the controller is further configured to one of set and change the pen color, the type of pen, the pen thickness, and the execution level of the function in the order of the categories according to the final command.

17. The apparatus of claim 15, wherein the storage unit is further configured to store an "interlocking application" and an "operation" in the categories.

18. The apparatus of claim 17, wherein the interlocking application comprises one of an email application and a social network service (SNS) application.

19. The apparatus of claim 18, wherein the controller is further configured to process information received in the voice control application through an interlocking application according to rearranged commands.

20. The apparatus of claim 12, wherein the controller is further configured to classify the respective keywords based on a category table pre-stored in the storage unit.

21. The apparatus of claim 12, wherein the controller is further configured to identify function commands corresponding to respective keywords and execute the identified function commands in the order of the categories.

* * * * *